Feb. 9, 1943. U. C. HAREN ET AL 2,310,851
APPARATUS FOR MAKING LAMINATED STRIPS
Filed Nov. 7, 1940 3 Sheets-Sheet 1
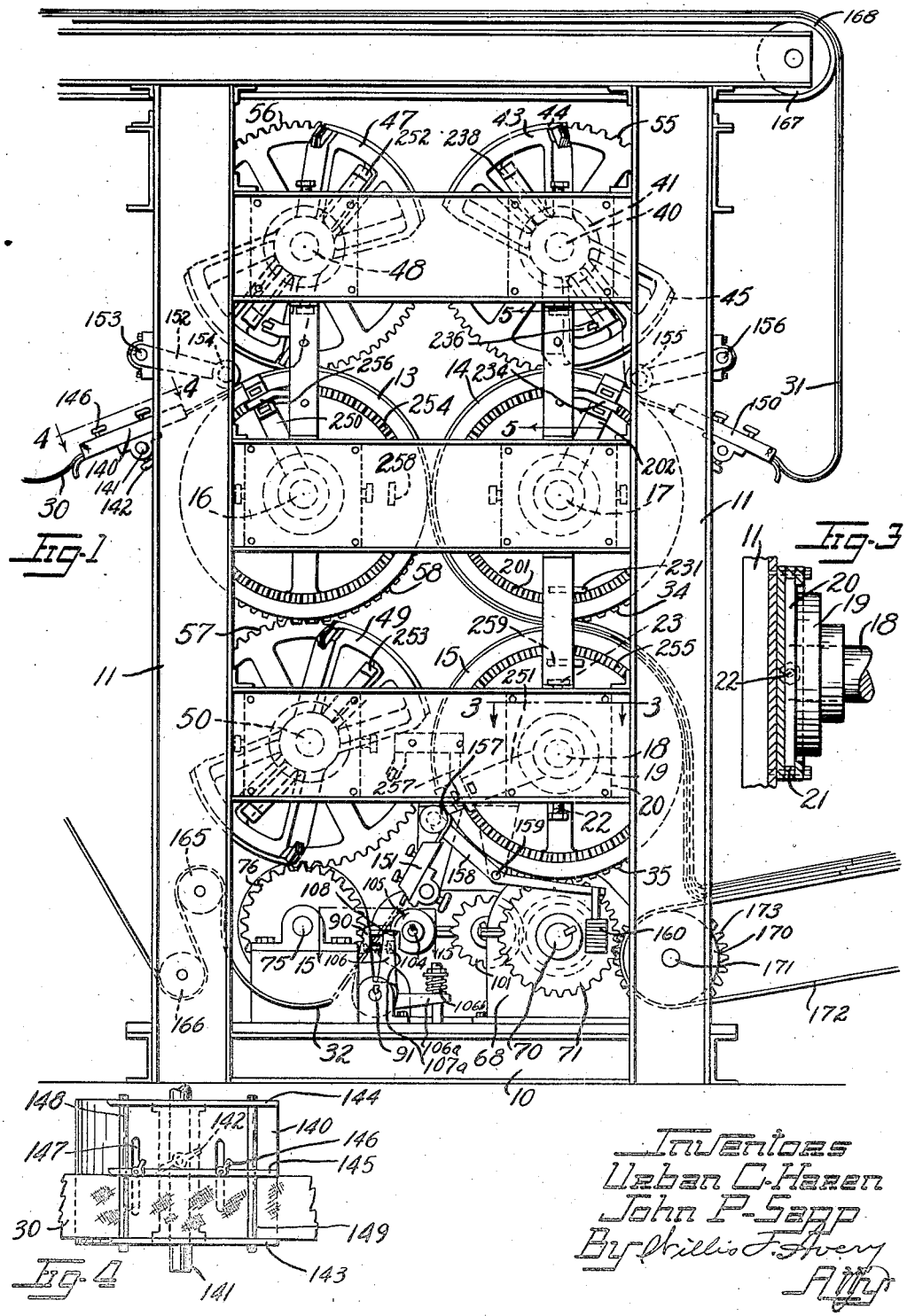

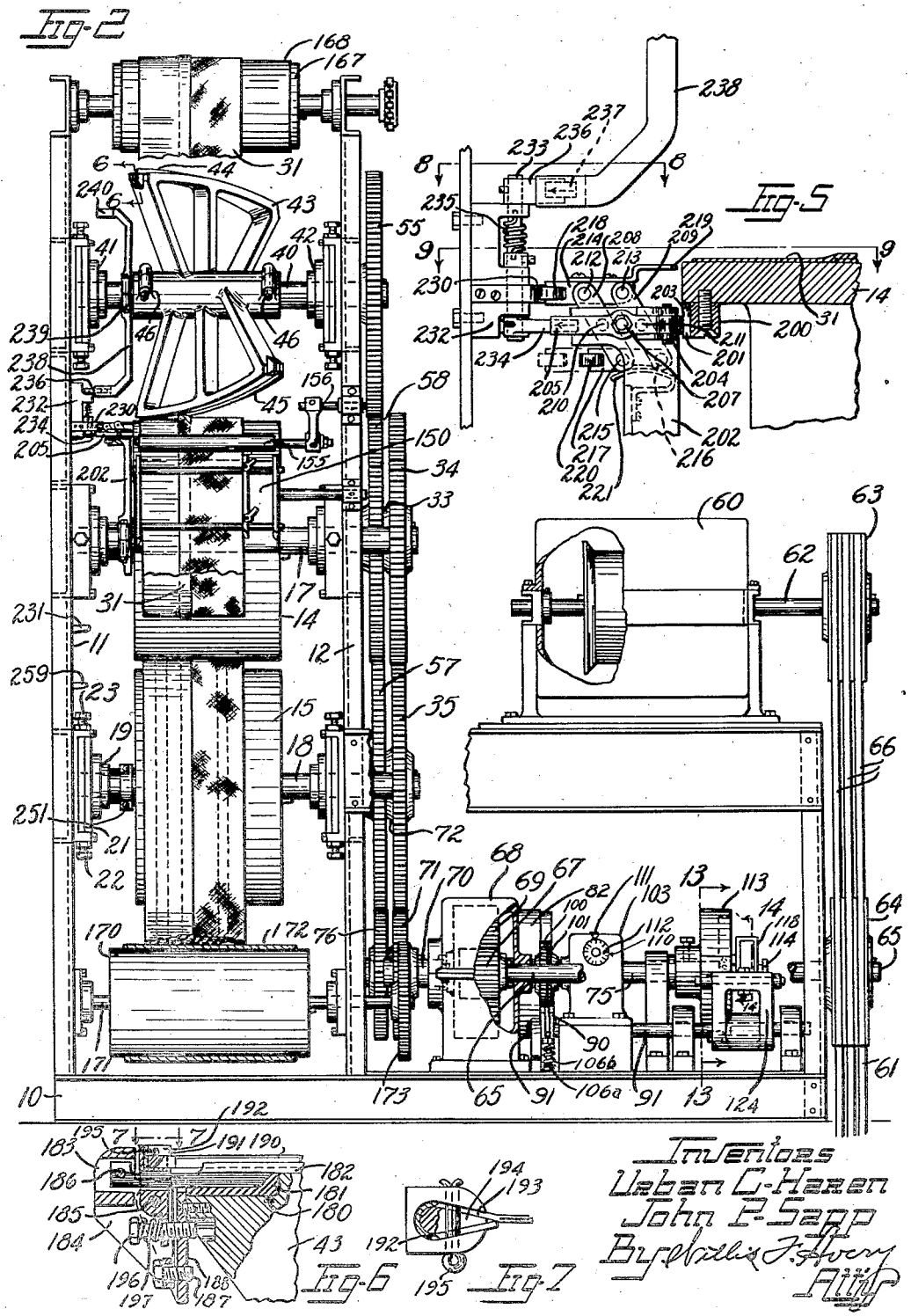

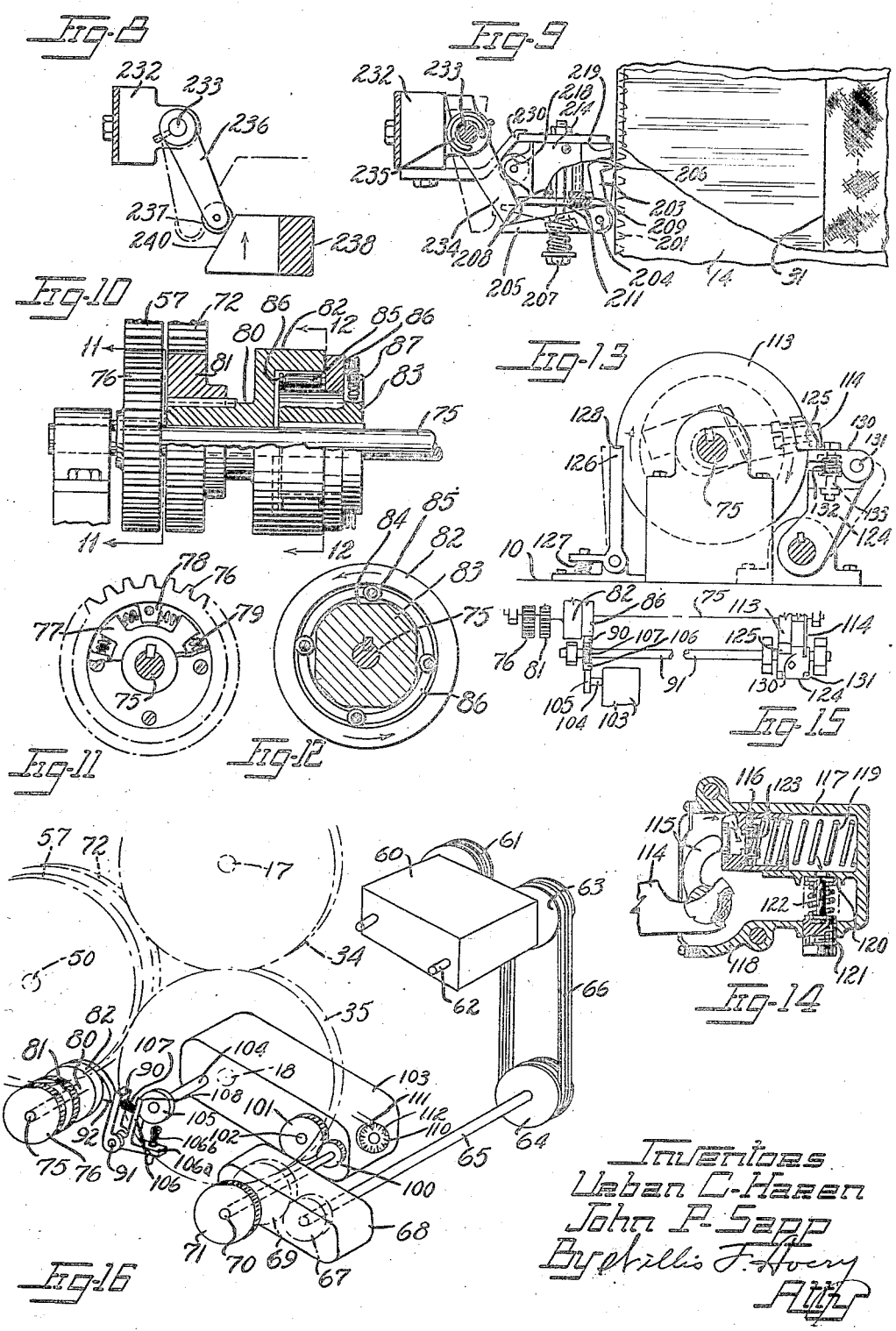

Patented Feb. 9, 1943

2,310,851

UNITED STATES PATENT OFFICE 2,310,851

APPARATUS FOR MAKING LAMINATED STRIPS

Urban C. Haren, Akron, and John P. Sapp, Kent, Ohio, assignors to The B. F. Goodrich Company, New York, N. Y., a corporation of New York Application November 7, 1940, Serial No. 364,664

9 Claims. (Cl. 164—68)

This invention relates to the art of making laminated strips of pliable material, and is especially useful in making laminated strips of rubber and fabric or other adhesive material having stepped-off or imbricated ends with the ends of the laminations bias cut and the strips of uniform length. Such strips have use in the manufacture of pneumatic tires and other articles in the rubber industry.

Heretofore such strips have been made by hand or by apparatus construced according to the patent of Matthias No. 1,667,009 of April 24, 1928, and whereas cutting and assembling the strips by hand was a slow operation and the strips so produced exhibited considerable variation in dimensions, the manufacture of the strips on the Matthias machine required a different machine for each different length of strip desired.

The present invention aims to overcome the difficulties heretofore experienced and to improve the Matthias machine.

The principal objects of the invention are to provide for accurately forming laminated strips of different lengths on the same apparatus, to provide quick adjustability to different size strips, to provide uniformity in the quality of product, and to provide for facilitating the operation.

These and other objects will appear from the following description and the accompanying drawings.

Of the drawings

Fig. 1 is a side elevation of the apparatus in its preferred form with the strip material passing therethrough, parts of the strips and of the conveyor belts being broken away.

Fig. 2 is an end elevation of the same looking from the right side of Fig. 1, parts of the strips and parts of the apparatus being broken away.

Fig. 3 is a detail sectional view of a bearing thereof, taken on line 3—3 of Fig. 1.

Fig. 4 is a detail face view of one of the strip guides, taken on line 4—4 of Fig. 1.

Fig. 5 is a detail view of mechanism for clamping an end of the strip to a drum, taken on line 5—5 of Fig. 1, parts being broken away.

Fig. 6 is a detail cross-sectional view of the knife, taken on line 6—6 of Fig. 2.

Fig. 7 is a detail view thereof, taken on line 7—7 of Fig. 6.

Fig. 8 is a detail sectional view taken on line 8—8 of Fig. 5.

Fig. 9 is a detail sectional view taken on line 9—9 of Fig. 5.

Fig. 10 is a detail view of the knife driving clutch, parts being broken away.

Fig. 11 is a sectional view of the mechanism shown in Fig. 10, taken on line 11—11 thereof, parts being broken away.

Fig. 12 is a sectional view of the clutch taken on line 12—12 of Fig. 10.

Fig. 13 is a detail sectional view showing the shock-absorbing mechanism, taken on line 13—13 of Fig. 2.

Fig. 14 is a detail sectional view of the shock-absorbing mechanism, taken on line 14—14 of Fig. 2.

Fig. 15 is a diagrammatic plan view of the clutch and shock-absorber mechanism.

Fig. 16 is a diagrammatic drawing showing the gearing.

The invention generally comprises a plurality of rotatable platen drums with means for guiding the various strip materials to their faces and means for driving all of the drums at any desired surface speed, and a flying cutter for cooperation with each drum to sever the strip passing thereover on the bias, together with means for driving the flying cutters at the same surface speeds as the drums and for stopping and starting movement thereof between cutting operations in timed relation to advance of the strips so as to cut different lengths of strips with the same platens and cutters. Means is also provided for guiding the strips and for holding free ends thereof into contact with the platens.

Referring to the drawings, the numeral 10 designates the bed of the machine to which are secured vertical horizontally spaced frame members 11, 12 between which a plurality of drum-like platens 13, 14, 15 are adjustably mounted, on shafts 16, 17, 18, respectively, for rotation. Each shaft is fixed to its drum and rotatably mounted in bearings adjustable toward and from a neighboring drum as shown in Fig. 3 where the shaft 18 is rotatably mounted in a bearing 19 fixed to a plate 20 which is slideable vertically with relation to the plane of the drawing along ways 21 formed on the vertical frame member 11, screws 22, 23 being provided to adjust the plate along its ways. The shaft 18 is adjustable vertically and shafts 16 and 17 are adjustable horizontally in similar manner. Strip material 30 is led over platen 13 where it meets strip material 31 led over platen 14. By adjustment of their bearings the platens 13 and 14 may be adjusted to press the two strips therebetween. The assembled strips 30, 31 pass around platen 14 where they meet a strip 32 led about platen 15, and by vertical adjustment of platen 15 the three strips are pressed together and pass from the machine. Shafts 16, 17, 18 have intermeshing gears 33, 34, 35 of the same size fixed thereto respectively, and the platens are the same pitch diameter as the gears, so that the platens operate in unison. The arrangement is such that gear 35 meshes with and drives gear 34 which in turn meshes with and drives gear 33.

The mechanism for supporting the cutters is as follows: A shaft 40 is rotatably mounted directly above platen 14, and parallel thereto, in bearings 41, 42 vertically adjustable on frame members 11, 12. A flying cutter support 43 of skeletal form is adjustably fixed to the shaft and supports oppositely disposed helical cutter blades 44, 45, adapted to be pressed against platen 14 to cut the strip on the bias. Clamp screws 46 provide means for clamping the cutters in any position circumferentially of the shaft. A similar flying cutter support 47 is mounted on a shaft 48 directly above platen 13 and a third cutter support 49 is similarly mounted on a shaft 50 below platen 13 and for cooperation with platen 15 to cut the strip 32. Shafts 40, 48 and 50 are adapted to be driven at the same speed and with the cutters they support traveling at the same surface speed as the platens 13, 14, 15. For this purpose shafts 40 and 48 have equal gears 55, 56 fixed thereto respectively and meshing with each other, and shaft 50 has a similar gear 57 fixed thereto. A similar idler gear 58 rotatable about shaft 16 meshes with gears 56 and 57. By adjustment of the cutters about their shafts, the respective cuts may be made out of step resulting in stepped or imbricated ends in the assembled strips.

Means is provided for driving the platens continuously at any desired speed corresponding to the speed of other mechanism which supplies the strip material or utilizes the plied up cut strips. For this purpose, a motor (not shown) drives the driving shaft of a speed changing device 60 of the "Reeves" type (see Fig. 2) through a multiple V-belt drive 61, and the driven shaft 62 of the speed changing device has a pulley 63 fixed thereto which drives a similar pulley 64 fixed to a shaft 65 through belts 66. Shaft 65 has a pinion 67 fixed thereto within a housing 68 of a geared speed reducer where it engages a gear 69 fixed to a shaft 70. Shaft 70 has a pinion 71 fixed thereto which engages gear 35, previously described, and through gear train 35, 34, 33 drives the platens continuously. An idler gear 72 on shaft 50 also meshes with gears 33 and 35 to reduce multiplied back-lash, all of the gears 33, 34, 35 and 72 having the same number of teeth.

For driving the cutter supports at the same surface speed as the platens, but intermittently, a horizontal shaft 75 (see Figs. 10 and 16) has a gear 76 rotatably mounted thereon over a spider 77 fixed thereto (see Fig. 11). The gear 76 has inwardly extending lugs 78 which extend between the legs of the spider and are cushioned therefrom circumferentially by coil springs 79. The springs permit limited circumferential motion of the gear with respect to the shaft and absorb shocks. Gear 76 meshes with gear 57 fixed to shaft 50 (see Figs. 1 and 2) and drives the cutter supports through gear train 57, 58, 56, 55 previously described. A quill 80 is rotatably mounted on shaft 75 and has a gear 81 fixed thereto which is of equal size with gear 76 and meshes with the constantly driven gear 72 which drives the cutter supports (see Fig. 16) through gear train 72, 57, 58, 56, 55. The quill is formed to provide the female driving member 82 of a roller clutch. The male member 83 thereof is fixed to the shaft 75 and has flats 84 formed thereon for clearing driving rollers 85 (see Fig. 12). A cage ring 86 separates the rollers and holds them in properly spaced positions. An extension coil spring 87 has one end fixed to the cage ring 86 and the other end fixed to clutch member 83 and normally holds the cage ring into engaged or driving position. A detent finger 90 is fixed to a rock shaft 91 (see Figs. 1, 15 and 16) in a position to engage a shoulder 92 on cage 86 to hold the cage in non-engaging position against the tension of spring 87. The arrangement is such that by rocking the rock shaft 91 the detent may be lifted clear of the shoulder 92 whereupon the coil spring 87 will engage the clutch and shaft 75 will be driven, driving the cutter supports at the same surface speed as the platens, and by return rocking movement of the rock shaft, the notch 92 will engage the detent 90 and release the clutch, stopping rotation of the cutter supports while the platens continue to rotate.

For actuating the detent 90 and thereby initiating cutting of the strips in timed relation with their advance whereby length of the strips is controlled, a gear pinion 100 (see Figs. 1 and 16) is fixed to constantly driven shaft 70, previously described, and meshes with a gear 101 on the driving shaft 102 of a variable speed control unit 103, of the "Reeves" type. The driven shaft 104 of the control unit 103 has a cam 105 fixed thereto. A tappet 106 is pivotally mounted on rock shaft 91 in a position to engage cam 105. An arm 106a is fixed to tappet 106 and a coil spring 106b acting against arm 106a, urges the arm in a direction to release the detent 90 from the shoulder 92 of the clutch cage 86. A compression coil spring 107 is mounted between detent 90 and tappet 106 and a bolt 107a passing through the spring limits movement of tappet 106 with respect to detent 90. The arrangement is such that when a notch 108 in the cam 105 arrives opposite the point of contact with tappet 106 the tappet is deflected into the notch 108 by spring 106b and the bolt 107a pulls detent 90 from under shoulder 92 causing the clutch to engage until a raised part of cam 105 forces the tappet away and the detent is forced into engagement with the shoulder 92 to disengage the clutch. By manipulating a hand wheel 110 on the "Reeves" speed changing unit which adjusts the speed ratio of shaft 102 to shaft 104 to positions indicated by a pointer 111 over a stationary scale 112, the speed changing unit 103 may be set for cutting any desired length of strip.

For stopping rotation of shaft 75 which drives the cutters in a determinate position with absorption of inertia when clutch members 82, 83 are disengaged, a disc 113 is fixed to the shaft 75 (see Figs. 2, 13, and 15). An arm 114 is rotatably mounted on the shaft adjacent the disc. Arm 114 has a lever 115 fixed thereto (see Fig. 14) which rests against a plunger 116 fitted in a cylinder 117 fixed to disc 113. Cylinder 117 forms part of an oil and spring check of which the cylinder forms the compression chamber and the casing 118 provides an oil storage chamber. A coil spring 119 in the cylinder holds the plunger normally in its outer position and arm 114 in its advanced position with relation to disc 113. A valve 120 provides a restricted passage from the cylinder to the casing 118 and may be adjusted by a screw 121 which adjusts the tension of a coil spring 122 which holds the valve against its seat. Return of oil through the plunger 116 is provided for by a check valve 123 in the plunger. An arm 124 fixed to rock shaft 91 normally stands in the way of a projection 125 on the periphery of disc 113 and also in the way of the end of arm 114. Arm 114 normally stands in advance of projection 125. As disc 113 rotates, the arm 124 first encounters arm 114 which it moves, compressing spring 119 and slowly forcing oil from cylinder 117 through valve 120 thereby absorbing the inertia and when projection 125 encounters arm 124, the disc 113 and shaft 75 to which it is fixed are positively stopped. Any rebound of the disc 113 is prevented by a pawl 126 pivoted on a stationary part of the machine and urged toward the periphery of the disc by a coil spring 127. A notch 128 in disc 113 is opposite the pawl when the projection 125 reaches arm 124 and the pawl engages the notch preventing reverse movement of the disc. Further cushioning of disc 113 is provided for by a strike plate 130 hinged, as at 131 to the end of arm 124 and supported therefrom by a coil spring 132. A screw 133 passing through the spring and strike plate is provided to adjust the initial tension on the spring.

As arm 124 is fixed to the rock shaft 91 to which detent 90 is fixed, when the shaft 91 is rocked to release the clutch cage and engage the clutch to drive shaft 75 and the cutters at the same surface speed as the speed of the platens the arm 124 is moved from under the projection 125 permitting rotation of shaft 75 and therefore movement of the cutters until the arm is returned to its original position.

For guiding strip material to the rotatable platens a guide plate 140, illustrated in Fig. 4, is adjustably mounted on a rod 141 extending from frame member 12, adjacent platen 13 and is fixed to the rod by clamp screws 142. The guide plate has marginal fixed fences, 143, 144 and a movable fence 145 secured thereto by clamp screws 146 passing through elongated slots 147. Rods 148, 149 passing through the fences retain the strip material in place. The guide plate may be adjusted to present a strip of any width within its capacity at any position axially of the platen. A similar guide plate 150 is mounted adjacent platen 14 and a similar guide plate 151 is mounted adjacent platen 15.

A swinging arm 152, pivoted at 153 to frame member 12, carries a roller 154 for pressing the strip 30 against platen 13. A similar roller 155 is pivotally mounted at 156 on frame member 12 to press strip 31 against platen 14. A third pressure roller 157 is mounted on a bell-crank 158, pivoted to the frame member 12 at 159 adjacent platen 15 to press the strip 32 thereagainst. A weight 160 on the bell crank acts to press this roll upwardly. Guide rolls 165, 166 are rotatably mounted between frame members 11, 12 to guide strip 32. A guide roll 167 is rotatably mounted between frame members 11, 12 to guide one end of a conveyor belt 168 which delivers strip 31 to the machine.

For delivering the laminated strip material from the machine a roller 170 (see Fig. 1) is fixed to a shaft 171 journaled in frame members 11, 12 and supports one end of a conveyor belt 172. A gear 173 is fixed to shaft 171 and meshes with constantly driven gear 71 which drives the conveyor continuously.

To provide for replacement of the cutting blades and to cushion them, the rotatable cutter supports are provided with removable cushioning and blade tensioning means. These are alike on each cutter support and only one of them will be described. Referring to Figs. 6 and 7, the cutter support 43 is formed with a channel 180 extending helically along its cutting face. A channel-shaped strip 181 of vulcanized cushion rubber is mounted in the groove, and a grooved strip 182 of soft metal is mounted in the groove of the rubber strip thereover. The metal strip extends at each end beyond the face of the cutter support and into a socket 183 formed in a bracket 184. Bracket 184 is pivotally mounted about a pin 185 fixed to the cutter support. A cotter pin 186 passes through the end of the strip 182 and bracket 184 to form a pivoted connection. A tension screw 187 passes through an aperture in the bracket and is threaded through a plate 188 fixed to the cutter support. The arrangement is such that after the metal strip is secured to a bracket 184 at each end of the cutter support by cotter pins 186, screws 187 may be adjusted to tension it longitudinally. The cutter blade 190 is formed of tempered strip steel sharpened to V-shape at one longitudinal edge. Its opposite edge is fitted in the groove of strip 182. For securing its ends at each end of the cutter support a post 191 is pivotally mounted on pin 185 and extends through a clearance opening in bracket 184. A dove-tailed socket 192 is formed in the top of the post to receive a loop 193 formed at the end of the blade. A filler block 194 of metal is inserted in the loop to prevent collapse thereof and a cotter pin 195 extends through the post above the loop to hold it radially of the cutter support. A tension screw 196 is threaded through plate 188 and extends through a clearance opening in the lower end of the post. A coil spring 197 encircles the screw 196 between the post and the head of the screw. By tightening the screw 196, the coil spring 197 is compressed and the post 191 is moved about pivot 185 to tension the blade.

When the strip material is not sufficiently adhesive to insure adherence thereof to the platens, means may be provided to clamp the leading ends of the strips to the platens so that they are positively fed to the assembling positions. Each of the platens may be supplied with clamping means for this purpose but as all are alike, only one of them will be described as follows: Referring to Figs. 2, 5, 8 and 9, an annular locking ring 200 having radially extending notches 201 in its exposed face is secured to one margin of the platen 14. An arm 202 (see Figs. 5 and 9) is rotatably mounted about shaft 17 to which platen 14 is fixed and extends radially of the shaft adjacent the locking ring. A dog 203 is pivotally mounted at 204 on the outer end of arm 202 (see Fig. 9). The dog is of bell-crank form and has a tail 205 extending axially away from the drum and a head 206 extending in the opposite direction for engaging the notches in the locking ring. A tension screw 207 extends through a clearance opening in the tail of the dog and is fixed to arm 202. A compression coil spring encircles the screw and normally presses the dog into engagement with the locking ring so that arm 202 is normally rotated about shaft 17 by the drum 14.

The outer end of arm 202 is slotted axially of the drum. A pair of toggle levers 208, 209 (see Fig. 5) are pivoted at their centers, as at 210, 211 to the arm 202 at one side of the slot and a similar pair are similarly pivoted at the other side of the slot. Their outer ends are pivoted at 212, 213 to a roller block 214 and their inner ends are pivoted at 215, 216 to a similar roller block 217. Block 214 has a cam roller 218 at its outer end and a clamping finger 219 at its inner end. Block 217 has a cam roller 220 on its outer end. A leaf spring 221 fixed to arm 202 engages the lower rounded ends of the toggle levers 208, 209 and is convexly bowed so as to retain them frictionally at either limit of their pivoted movement. The arrangement is such that when the block 214 is moved toward platen 14 its clamping finger 219 is moved over the strip 31 on the face of the drum and is clamped thereagainst by spring 221 and at the same time roller block 217 is moved away from the drum. When roller block 217 is moved toward the drum finger 219 is withdrawn and the strip is released. Due to the toggle construction and the shape of the spring 221 contact with the most extended cam roller tending to cause movement of the roller toward the drum will cause the position of the toggle mechanism to change by a snap movement. At a position where the strip material first contacts the platen a stationary cam 230 (see Figs. 2 and 9) is fixed to a frame member 11 in the path of cam roller 218 and as the roller contacts therewith the roller is forced toward the platen causing the clamp finger to engage over the leading end of the strip. At any desired further position in the path of rotation, as where the leading end enters the bight of two platens and meets another strip a second fixed cam 231 (see Fig. 1) is mounted on the frame in a position to engage and deflect cam roller 220 to release the strip.

Stationary cam 230 previously mentioned is mounted on a block 232 (see Figs. 5, 8, and 9) in which a rock-shaft 233 is rotatably mounted on an axis radial to the axis of the platen 14. An arm 234 is fixed to the shaft and extends radially therefrom so that in one position shown in full lines in Fig. 9, it engages the passing tail 205 of the locking dog and releases the dog from the platen, stopping rotation of arm 202, and in a second position, shown in dot and dash lines, the arm clears the tail of the dog. A torsional coil spring 235 encircles the shaft 233 and has its ends fixed to the shaft 233 and the block 232 respectively. The arrangement is such that the arm 234 is normally held in the position to engage the tail of the dog as shown in Fig. 9.

A roller arm 236 (see Figs. 5 and 8) is fixed to the shaft 233 and has a roller 237 mounted on its outer end. A cam bar 238 is adjustably fixed to the cutter supporting shaft 40 (see Figs. 2 and 8), as by clamp screws 239, and has an outwardly turned end with an inclined cam surface 240. Where the cutter support has more than one cutter, as shown, a similar cam surface is provided for each cutter and, as illustrated, the cutter support has two opposite cutters and the cam bar has corresponding cams at opposite ends thereof. The cam surfaces are in the path of roller arm 236 when it is in the full line position of Fig. 8 and clear it in dot and dash line position and the arrangement is such that as a cam surface 240 passes the arm 236, arm 236 is deflected, turning shaft 233 and withdrawing arm 234 from the path of the tail 205 of dog 203 and the dog 203 is released from the platen and the arm 202 stops rotating beyond this station with the drum. As the finger 219 also holds the arm 202 to the platen when it is clamping the strip to the drum the cam surface 230 is so located that the finger 219 is off the surface of the platen at the time that the dog 205 is released and arm 202 is thus stopped with the cam roller 218 just contacting with cam 230 and ready to engage the finger 219 over the face of the platen. Arm 238 is so set with relation to a cutter blade that as the cutter blade contacts the strip of material, the arm 238 releases the arm 234 permitting the dog 205 to engage the platen. This starts the arm 202 in motion and as the roller 218 passes the cam 230 the finger 219 is engaged over the leading end of the strip where it remains until the roller 220 engages cam surface 231 and releases the finger. The dog 203 still engages the platen however and the arm 202 therefor continues rotating throughout the remaining portion of the revolutions of the platen. When the next cut is to be made by approach of the cutter support the dog is again engaged. In the meantime the platen 14 may have rotated more than a single revolution depending upon the length of the strips to be cut, and the arm 202 remains in position to engage the leading end of the next strip to be cut due to the fact that the cutter support and cam surface 240 are not in motion.

The operation of the clamping mechanism is as follows: As the drum 14 is constantly rotated, finger 219 is clamped over the leading end of the strip 31 at the cutting position over the surface of the drum by contact of roller 218 with stationary cam 230 and is released by contact of roller 220 with stationary cam 231 at the position where the leading end of the strip meets the surface of platen 15. This movement is independent of the cutter operation and takes place regularly at each revolution of drum 14. When finger 219 is withdrawn, arm 202 would stop rotating were it not for dog 205 which remains engaged with notch 201 throughout substantially a complete revolution of the drum until it is withdrawn by contact of the tail 205 with arm 234 at the cutting position as shown in Fig. 9. The arm 202 will stop at this position while the drum 14 continues to rotate unless roller 237 happens to be depressed to the dot and dash position of Fig. 8 by rotation of the cutter and its cam arm 238 at the moment the tail 205 reaches the illustrated position, in which event the dog 203 would remain engaged with the notch 201 and the arm 202 would continue its revolution with drum 14 through another revolution. With the exception of the coincident arrival of the dog 203 at the position of Fig. 9 and the depression of arm 236 by passing of cam arm 238, the tail of the dog 203 is depressed by contact of arm 234 at the position of Fig. 9, as there shown, and arm 202 is stopped until cam arm 238 withdraws, in passing, arm 234 to the dot and dash position, whereupon the dog 203 engages a notch 201 of the constantly rotating drum and arm 202 is carried along with the drum. As the roller 218 passes the stationary cam 230 it is forced toward the drum and advances the finger 219 over the new leading end of the strip which it clamps until released by contact of roller 220 with stationary cam 231.

Arms 250, 251 carrying similar strip clamping mechanism are rotatably mounted on shafts 16 and 18 respectively adjacent platens 13 and 15 and operate in the same manner, and cam bars 252, 253, corresponding to cam bar 238 are adjustably mounted on shafts 48 and 50 respecto locking rings 254, 255 of platens 13 and 15 tively for releasing and setting the locking dogs respectively. The dog-releasing arms corresponding to arm 234 are shown at 256, 257, and stationary cams for releasing the clamping fingers are shown at 258, 259.

The operation of the specific mechanism will be apparent from the foregoing description. The general operation of the apparatus is as follows: Strip 30 is started through the guide 140 and its end is placed over the platen 13, the roller 154 holding it in driven relation thereto and the guide 140 being adjusted to deliver the strip in the desired alignment. Strip 31 is led through guide 150 and strip 32 is led through guide 151 which are also properly adjusted. Hand wheel 110 is then adjusted to bring the pointer 111 to the position on the scale 112 indicating the desired length of the laminated cut strips. The motor which drives the machine is then started and the strips are automatically cut to length assembled in laminated form and delivered over belt 172. Due to setting of the cutter holders on their shafts in stepped relation to each other, the ends of the plies of material are stepped off to assist in splicing them in annular form in the tire or other article. Where the material is adhesive, the laminated strips will come from the machine spliced end to end and may be separated when desired.

Due to the novel construction of the apparatus laminated strips of material of any desired length having stepped or imbricated ends may be automatically produced.

Variations may be made without departing from the scope of the invention as it is defined by the following claims.

We claim:

1. Apparatus for cutting a strip of pliable material, said apparatus comprising a continuously rotatable support for progressively advancing strip material, driving means therefor, a cutting member adapted by rolling contact with said support successively to sever the strip material as it is advanced by pressing it against the moving support, means for advancing said cutting member with said support while said material is being severed, and means for adjustably interrupting the advance of said cutting member between successive cuts to regulate the length of the cut strips.

2. Apparatus for cutting a strip of material, said apparatus comprising a continuously rotatable support for progressively advancing strip material, driving means for rotating the support, a cutting member adapted successively to sever the strip material by pressing it against the rotating support as it is advanced, means for advancing said cutting member with said support while said material is being severed, and means for adjustably interrupting the advance of said cutting member between successive cuts to regulate the length of the cut strips.

3. Apparatus for cutting a strip of material, said apparatus comprising a continuously rotatable support for progressively advancing strip material, driving means for rotating the support, a rotatable cutting member adapted successively to sever the strip material by pressing it against the rotating support as it is advanced, means for rotating said cutting member in rolling contact with said support while said material is being severed, and means for adjustably interrupting the rotation of said cutting member between successive cuts to regulate the length of the cut strips.

4. Apparatus for cutting a strip of material, said apparatus comprising a continuously rotatable platen for progressively advancing strip material, driving means for continuously rotating said support, a rotatable cutting member adapted successively to sever the strip material by rolling contact with said platen, means for driving said cutting member in synchronism with said platen during a cutting operation, means for interrupting rotation of said cutting member between successive cuts, and adjustable timing means for regulating the distance between cuts.

5. Apparatus for cutting a strip of material, said apparatus comprising a rotatable platen for progressively advancing strip material, driving means for continuously rotating said platen, a rotatable cutting member adapted successively to sever the strip material by rolling contact with said platen, means for driving said cutting member at the same surface speed as said platen during a cutting operation, means for interrupting rotation of said cutting member between successive cuts, adjustable timing means for regulating the distance between cuts, and means for clamping the leading end of the cut strips to the platen during at least a part of a revolution of the platen.

6. Apparatus for cutting a strip of material, said apparatus comprising a rotatable platen for progressively advancing strip material past a cutting station to an assembling station, driving means for continuously rotating said platen, a rotatable cutting member adapted successively to sever the strip material by rolling contact with said platen, means for driving said cutting member at the same surface speed as said platen during a cutting operation, means for interrupting rotation of said cutting member between successive cuts, adjustable timing means for regulating the distance between cuts, means for clamping the strip material to the platen adjacent each cut, and means at said assembling station for releasing said clamping means.

7. Apparatus for cutting a strip of material, said apparatus comprising a rotatable platen for progressively advancing strip material past a cutting station to an assembling station, driving means for continuously rotating said support, means at the cutting station for severing the strip material as it is advanced, means for clamping the strip material to the platen at the cutting station, and means at the assembling station for releasing said clamping means without interrupting the advance of the cut material.

8. Apparatus for cutting a strip of material, said apparatus comprising a rotatable platen for progressively advancing strip material past a cutting station to an assembling station, driving means for continuously rotating said platen, means at the cutting station for severing the strip material as it is advanced, clamping means adjacent the platen for clamping material against the platen, a rotatable support for said clamping means, locking means carried by said support for locking said support to said platen for rotative movement therewith, means at said assembling station for releasing said clamping means from the strip material, and means at the cutting station for releasing said locking means and stopping rotation of said support.

9. Apparatus for cutting a strip of pliable material, said apparatus comprising a movable support for progressively advancing strip material, driving means for continuously advancing said support in a single direction, a rotatable cutting member adapted successively to sever the strip material by rolling contact with said support as the support is advanced by pressing it against the support, means for advancing said cutting member in synchronism with said support while the material is being severed, means for adjustably interrupting the advance of said cutting member between successive cuts to regulate the length of the cut strips, and adjustable timing means for regulating the distance between cuts.

URBAN C. HAREN.
JOHN P. SAPP.

CERTIFICATE OF CORRECTION.

Patent No. 2,310,851.  February 9, 1943.

URBAN C. HAREN, ET AL.

It is hereby certified that error appears in the printed specification of the above numbered patent requiring correction as follows: Page 4, second column, line 62, strike out the words "to locking rings 254, 255 of platens 13 and 15" and insert the same after "dogs" in line 63; and that the said Letters Patent should be read with this correction therein that the same may conform to the record of the case in the Patent Office.

Signed and sealed this 30th day of March, A. D. 1943.

(Seal)

Henry Van Arsdale,
Acting Commissioner of Patents.